G. H. CURTISS AND H. KLECKLER.
FLYING BOAT CONSTRUCTION.
APPLICATION FILED DEC. 23, 1916.
1,351,742.
Patented Sept. 7, 1920.
9 SHEETS—SHEET 1.
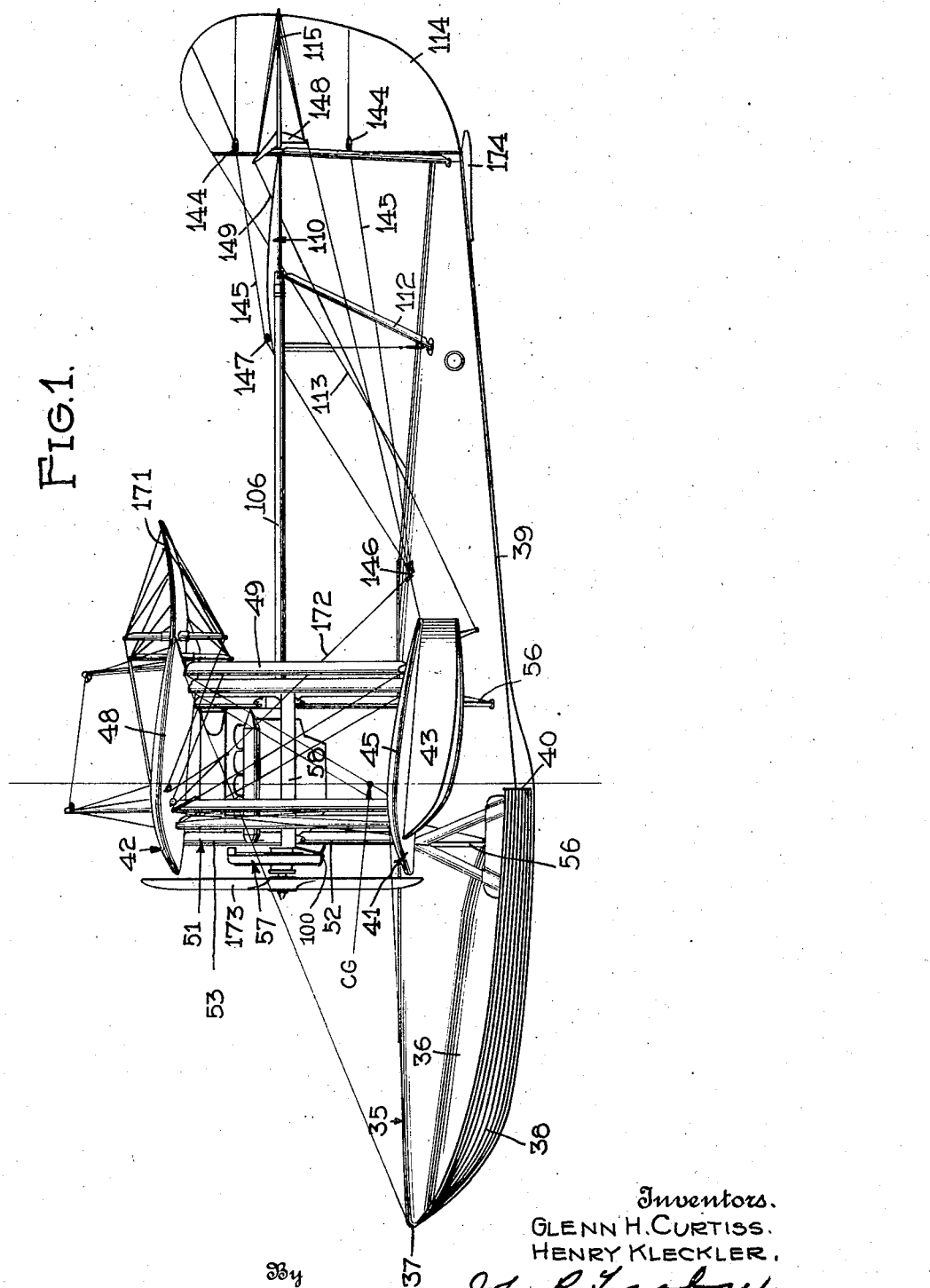
Inventors.
GLENN H. CURTISS.
HENRY KLECKLER.
By John P. Larbox
Attorney

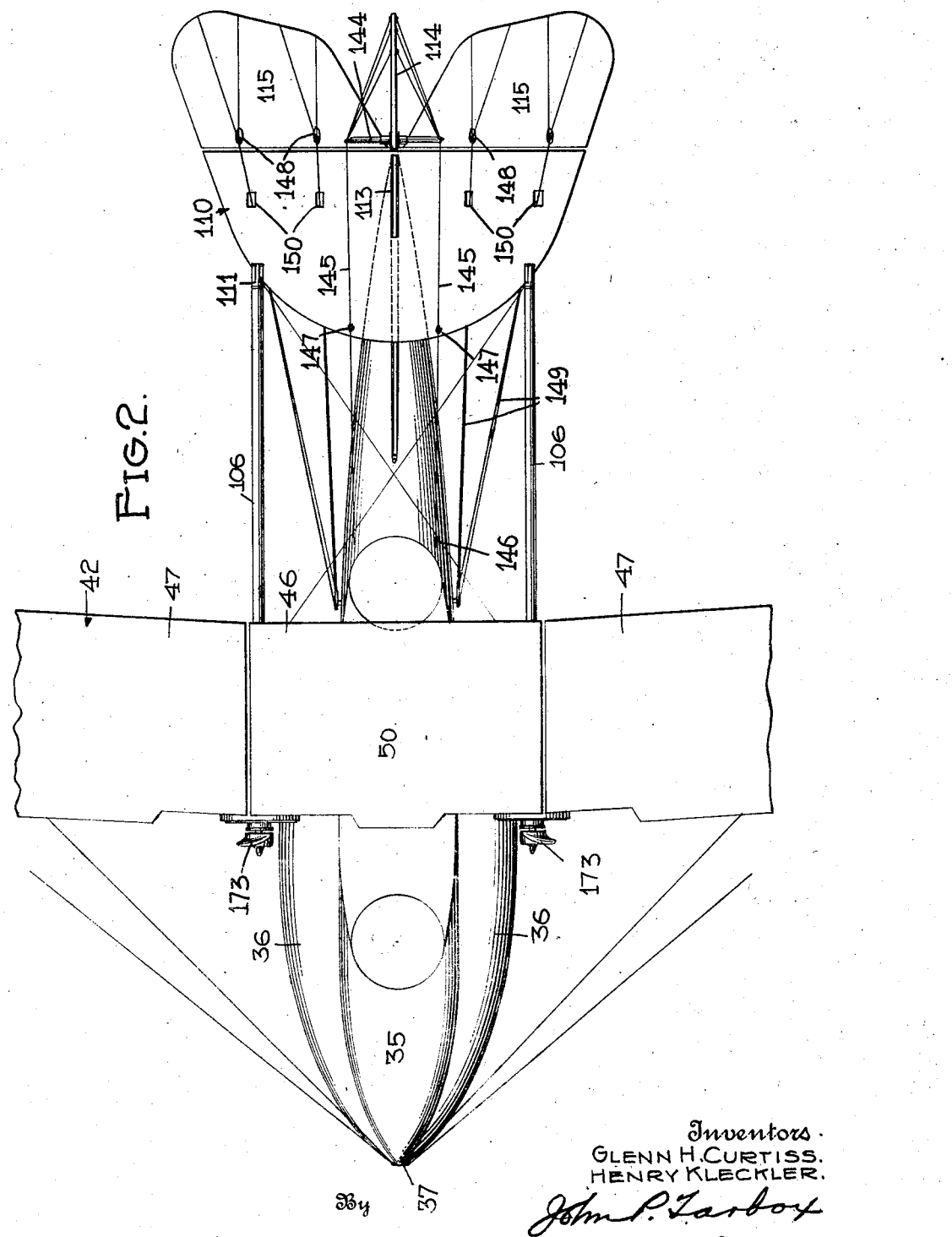

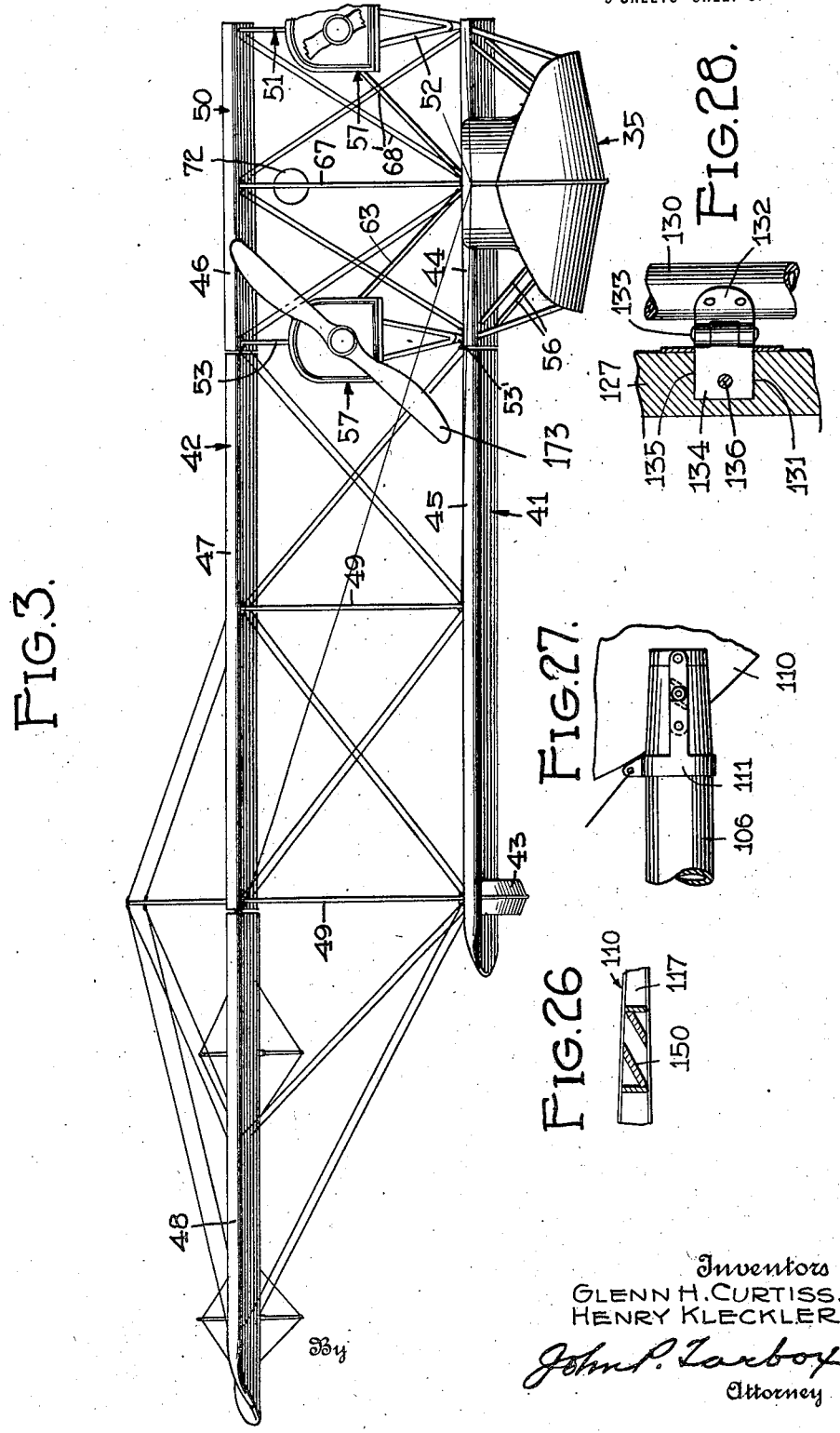

G. H. CURTISS AND H. KLECKLER.
FLYING BOAT CONSTRUCTION.
APPLICATION FILED DEC. 23, 1916.
1,351,742.
Patented Sept. 7, 1920.
9 SHEETS—SHEET 4.
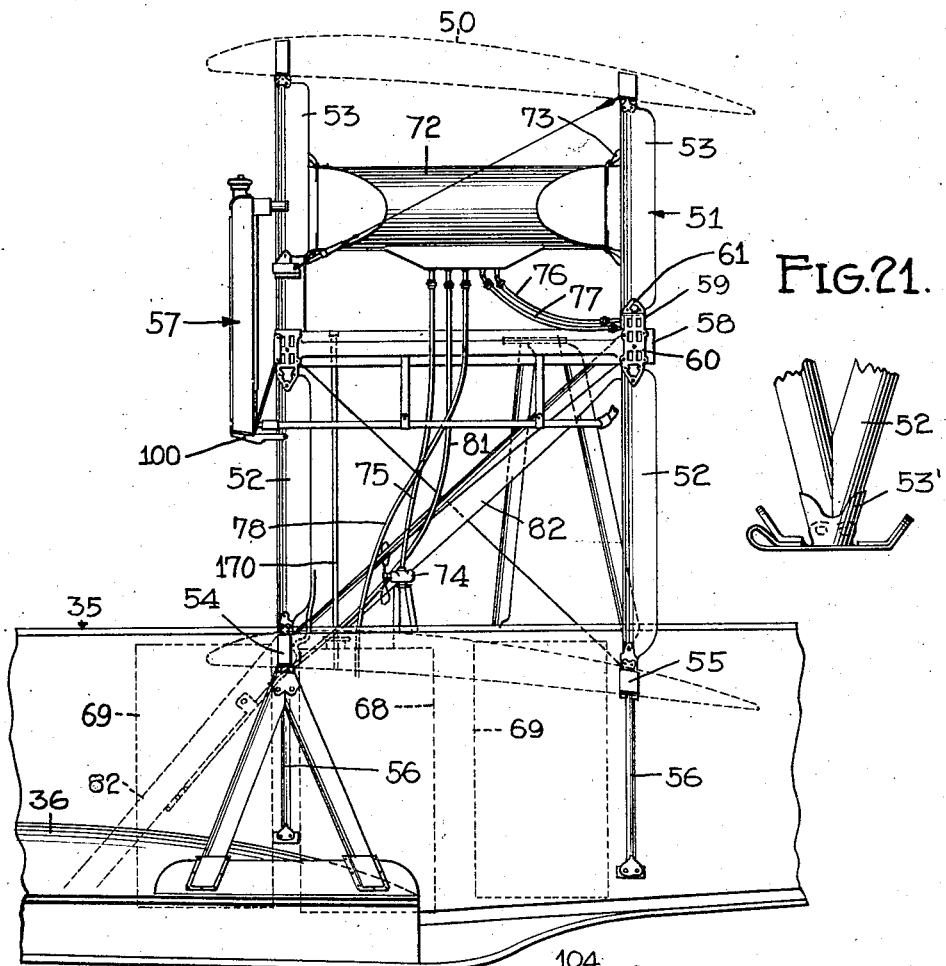
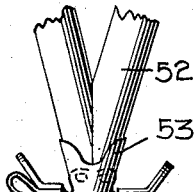
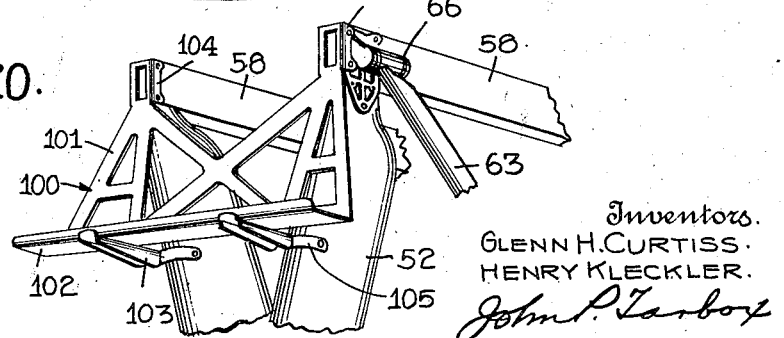
Inventors.
GLENN H. CURTISS.
HENRY KLECKLER.
John P. Tarbox
Attorney

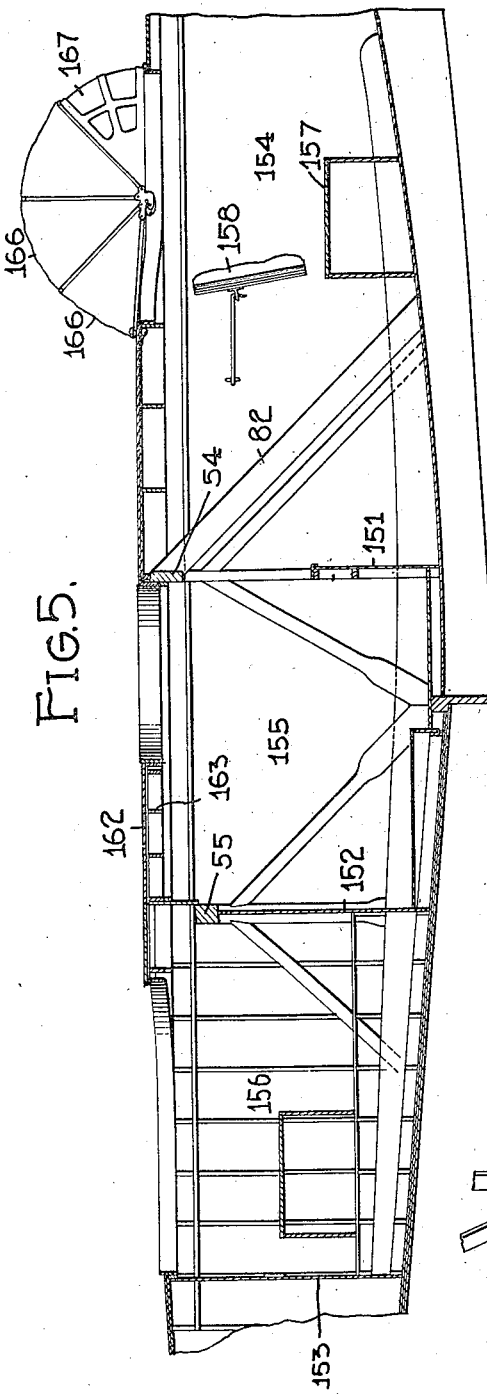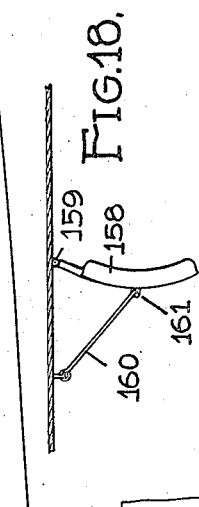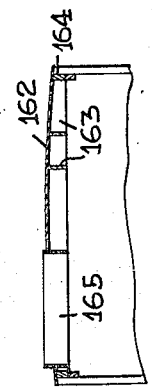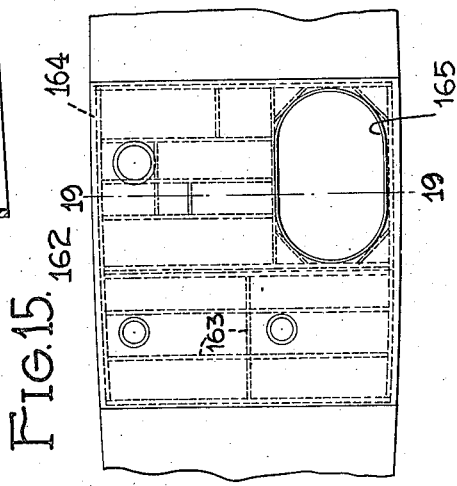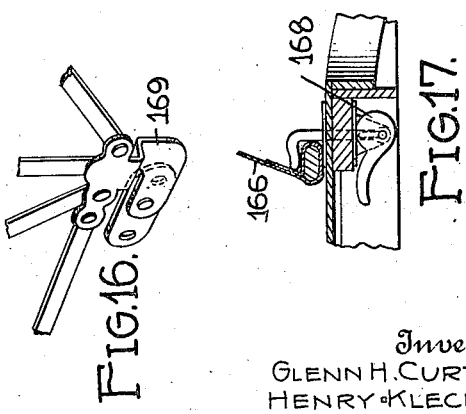

G. H. CURTISS AND H. KLECKLER.
FLYING BOAT CONSTRUCTION.
APPLICATION FILED DEC. 23, 1916.

1,351,742.

Patented Sept. 7, 1920.
9 SHEETS—SHEET 6.

Inventors
GLENN H. CURTISS.
HENRY KLECKLER.
By John P. Tarbox
Attorney

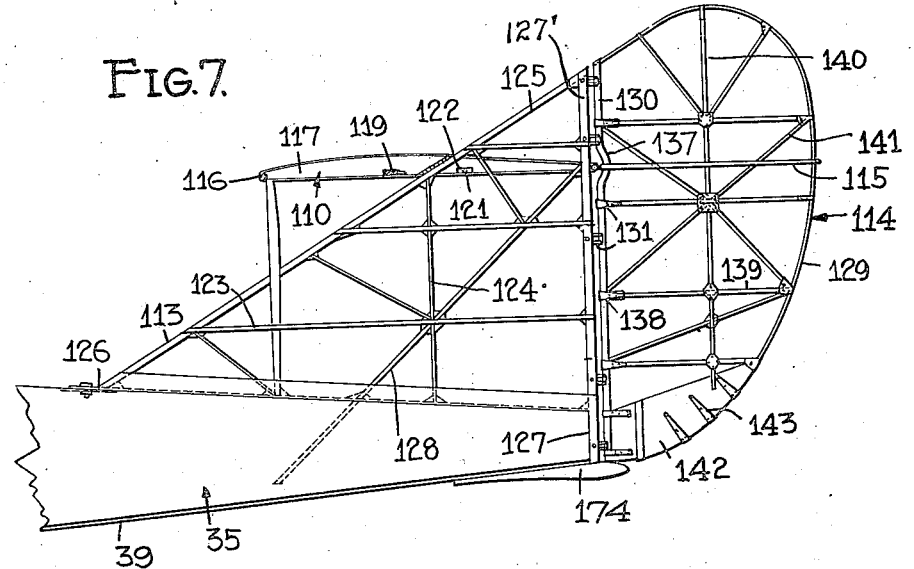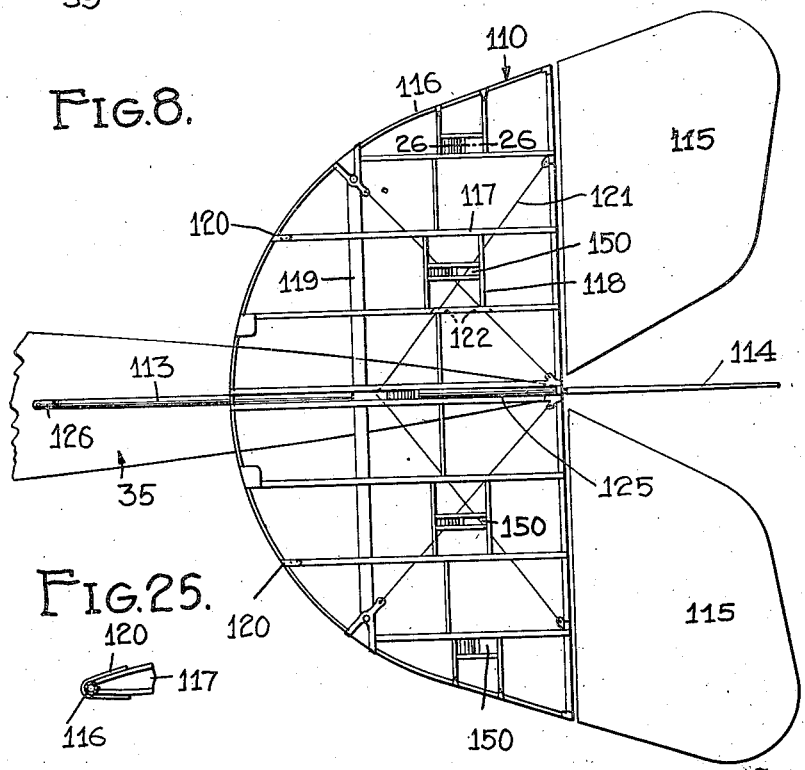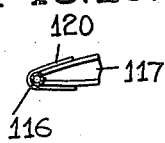

G. H. CURTISS AND H. KLECKLER.
FLYING BOAT CONSTRUCTION.
APPLICATION FILED DEC. 23, 1916.
1,351,742.
Patented Sept. 7, 1920.
9 SHEETS—SHEET 8.
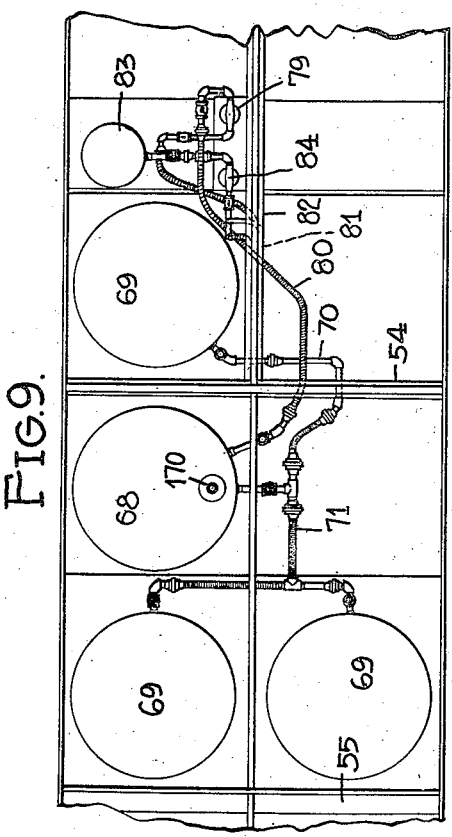
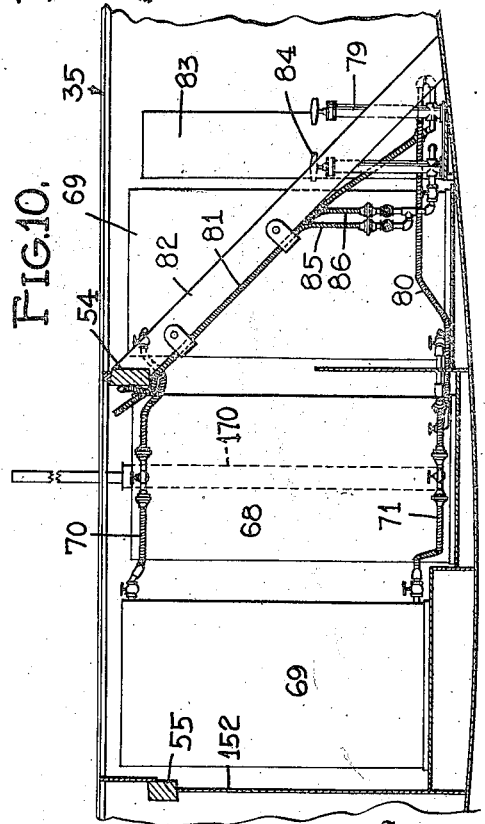
Inventors.
GLENN H. CURTISS.
HENRY KLECKLER.
Attorney G. H. CURTISS AND H. KLECKLER.
FLYING BOAT CONSTRUCTION.
APPLICATION FILED DEC. 23, 1916.
1,351,742.
Patented Sept. 7, 1920.
9 SHEETS—SHEET 9.
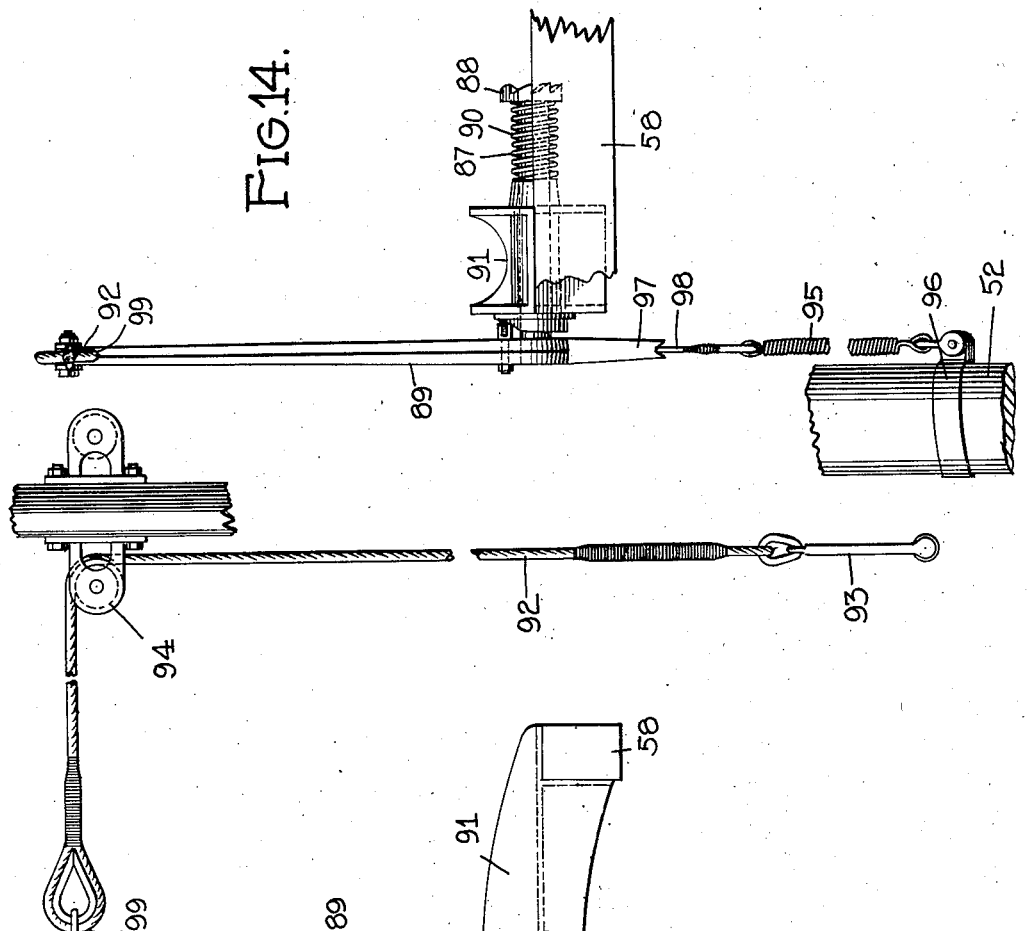
Inventors.
GLENN H. CURTISS.
HENRY KLECKLER.
By
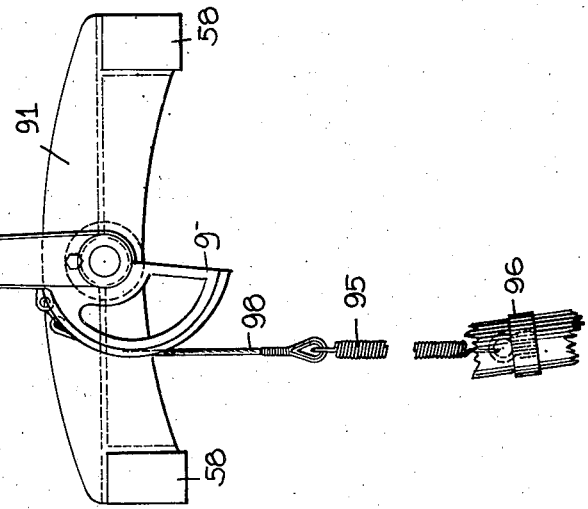
Attorney

UNITED STATES PATENT OFFICE.

GLENN H. CURTISS AND HENRY KLECKLER, OF BUFFALO, NEW YORK, ASSIGNORS TO CURTISS AEROPLANE & MOTOR CORPORATION, A CORPORATION OF NEW YORK.

FLYING-BOAT CONSTRUCTION.

1,351,742.　　　　Specification of Letters Patent.　　Patented Sept. 7, 1920.

Application filed December 23, 1916. Serial No. 138,633.

*To all whom it may concern:*

Be it known that we, GLENN H. CURTISS and HENRY KLECKLER, citizens of the United States, residing at Buffalo, in the county of Erie and State of New York, have invented certain new and useful Improvements in Flying-Boat Construction, of which the following is a specification.

Our invention relates to aircraft and has reference more particularly to improvements in flying boats. Many features of the flying boat have been described and claimed in applications now pending. Application, Serial No. 65,372, filed Dec. 6, 1915, is drawn to cover the hull construction *per se*, application Serial No. 88,091, to cover broadly the control mechanism, and application, Serial No. 131,964, filed Nov. 17, 1916, to cover broadly the fan pump. These features will therefore be touched upon but lightly or generally in the present case.

As an object of the invention we contemplate an improved and simplified arrangement of motive fluid tanks interiorly of the hull symmetrically about the transverse vertical plane of the center of gravity. These tanks, including a plural number of supply tanks and a single service tank (the number may be varied) constitute the principal item of variable or exhaustible load.

A further object of the invention subordinate to the foregoing is the disposition of the supply tanks in a horizontal plane above the horizontal plane of the base end of the service tank. This arrangement is effective in obtaining uninterrupted or continuous fuel feed through gravitational force.

Other characteristics of the invention are the improved freely foldable seat-back arrangement permitting access to the motive fluid tanks from the forward cockpit of the craft; the disposition of the wing-structure diagonal brace above the variable or exhaustible load; the provision of lap-joint fittings to secure rigidity and strength; the interposing of vibration absorbing devices between the engine bed or beds and the hull; the provision of an improved radiator bracket constructed to engage with both the engine-bed beams and the supporting struts therefor; the inclusion of the motor or motors as an element or elements of one or more wing-post-frames; the introduction of many novel constructional details as elements of the empennage; and the provision of simplified means for starting the motor or motors without danger and from a point in convenient proximity to the hull.

In describing our invention in detail, reference will be had to the accompanying drawings wherein like characters of reference designate like or corresponding parts throughout the several views, of which:

Figure 1 is a side elevation of the improved flying boat;

Fig. 2 is a top plan view;

Fig. 3 is a front end elevation;

Fig. 4 is a side elevation of the engine section;

Fig. 5 is a longitudinal section of the hull;

Fig. 7 is a side elevation of the empennage, the fabric covering of the vertical stabilizer and rudder having been removed;

Fig. 8 is a top plan view of the empennage, the fabric covering of the horizontal stabilizer having been removed;

Fig. 9 is a plan view of the mid section of the hull illustrating the motive fluid tank arrangement;

Fig. 10 is a longitudinal sectional view of the mid section of the hull;

Fig. 11 is a cross section of the hull at the mid section;

Fig. 12 is a detail section of the gasolene gage;

Fig. 13 is a rear end elevation of one of the engine starting devices;

Fig 14 is a side elevation of the engine starting device;

Fig. 15 is a plan view of the hatch;

Figs. 16 and 17 are views respectively in perspective and in section illustrating in detail the hinge and the fastening means for the cockpit covering or hood;

Fig. 18 is a detail top plan view of one of the seat backs and its mounting;

Fig. 19 is a section on the line 19—19 of Fig. 15;

Fig. 20 is a perspective view of the radiator bracket and its mounting;

Fig. 21 is an elevation of one of the wing post frame sockets;

Fig. 25 is an elevation of one of the rib clips of the horizontal stabilizer;

Fig. 26 is a section on the line 26—26 of Fig. 8;

Fig. 27 is a plan view of the connection at the after end of one of the rearwardly extending spars; and Fig. 28 is a sectional view detailing one of the mortised rudder hinges.

Figure 6:
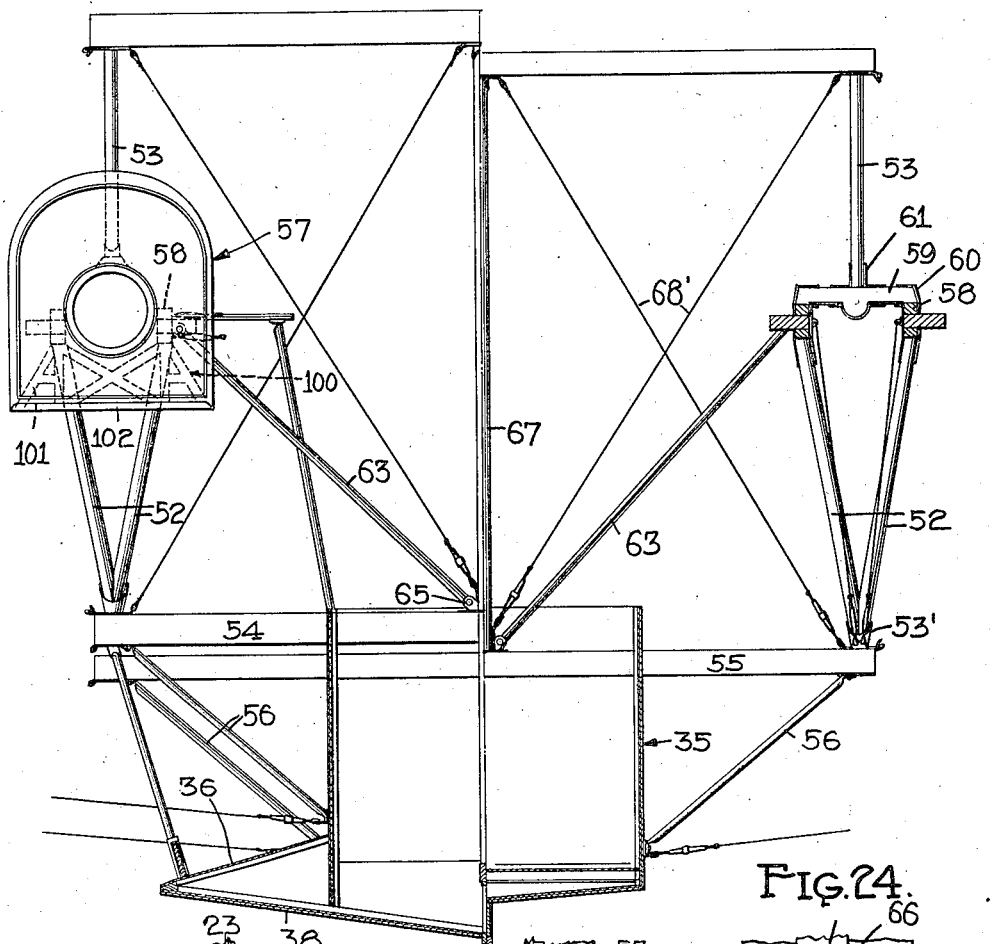
Fig. 6 is a cross section of the hull in advance of the engine section.

The hull of the craft designated in its entirety by the numeral 35 is equipped at its forward end with fin excrescences 36 which emanate from the extreme bow (at the point 37), the fins, at the bow having their edges or margins heavily overhung. From said point 37 aft the fins widen abruptly and thence continue rearwardly without approach to the chines or gunwales of the hull. Beneath said forward portion of the hull the hydroplaning bottom is of V-form, the angle of the V increasing gradually rearwardly. Said V-form hydroplaning bottom is designated 38. Both the fins 36 and the bottom 38 terminate in the transverse vertical plane of a line projected vertically through the center of gravity CG. Aft of the hydroplaning surface 38, the bottom of the hull extends upwardly at a salient angle to the stern. This section of the hull bottom, non-hydroplaning, is constructed substantially flat. Said non-hydroplaning surface is designated 39.

Supporting surfaces 41 and 42 extend transversely across the hull in such relation thereto as to bring the center of pressure, center of gravity and rearwardly facing step 40 (characteristic of Curtiss flying boats) in substantially the same vertical plane. This step 40 terminates the hydroplaning bottom at its after end. Wing pontoons 43 are provided at the respective lower wing or surface terminals.

Both supporting surfaces 41 and 42 are made up of separable sections or panels. The lower supporting surface comprises an engine section panel 44 (built-in) and outer panels 45, and the upper supporting surface an engine section panel 46, intermediate panels 47, and outer panels 48, the latter extending considerably beyond the tips of the lower supporting surface to provide lateral overhangs. Each of the several panels is made detachable for quick assembly.

Wing posts 49 interconnect the surfaces 41 and 42 laterally of the engine section, designated in its entirety by the numeral 50, and wing post frames 51, the engine section panels. Each wing post frame comprises mating V-struts 52 and a continuing center strut 53, the former engaging the lower engine section panel 34 and the latter the upper engine section panel 46. An appropriate socket 53' (see Fig. 21) is arranged to receive the mating V-strut terminals.

To secure greater rigidity and strength at the engine section of the craft, the lower wing beams 54 and 55 of the engine section panel 44 extend transversely through the hull respectively fore and aft of the step 40. The wing post frames in each instance are erected upon said beams and the beams braced as indicated at 56 diagonally inwardly to the hull.

Preferably, the craft is equipped with a multiple unit power plant. But two power units are provided in the embodiment selected. These units, gasolene motors, each designated in its entirety by the numeral 57, are disposed symmetrically at opposite sides of the longitudinal axis of the craft intermediate the surfaces 41 and 42. Engine beds, comprising beams 58, parallel throughout, support the respective motor units, the beams 58 terminally engaging the struts 52 of the several wing post frames. The center struts 53 of the forward wing post frames are founded upon the crank cases of the respective motors to include said motors as elements of the frames. The use of a cross bar at the forward end of the engine beds is in this way avoided. At the rear end of the engine beds, however, a cross bar 59 for each bed is provided and the center struts of the rear wing post frames are founded upon said bars.

Figure 22:
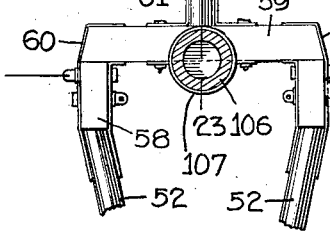
Fig. 22 is a rear end elevation of one of the engine beds.

Wherever possible lap-joint fittings are used. Especially is it desirable that fittings of this type be provided at the terminals of the engine beds. Upon reference to Fig. 22 it will be noted that the lap-joint fittings 60 and 61 therein shown engage respectively the engine bed beams, the cross bar and the rear diverging struts on the one hand and the cross bar and the rear center strut on the other.

Ears 62 are formed on certain of the fittings 60 to provide anchorages for diagonal brace bars 63. These bars 63 are terminally pivoted as indicated at 64 and 65 respectively and laterally brace the engine beds and at the same time minimize motor vibration. Said braces are arranged in pairs disposed respectively in the vertical planes of the beams 54 and 55 upon which they are founded. Rubber strips 66 of considerable thickness are provided at the terminal pivots 64 and 65 to absorb vibration shocks and accordingly prevent transmission of vibration to the hull. Center wing posts 67 interconnect and with the usual lift and drift wires 68' interbrace the panels 44 and 46.

The motive fluid tanks (the number of which may be varied) for the propelling power plant are located preferably interiorly of the hull substantially symmetrically about the vertical plane of the center of gravity. These tanks (see Figs. 9–11 inclusive) include a service tank 68 and a plural number of supply tanks 69, each of the several supply tanks having connection with the service tank 68 by upper and lower pipe lines 70 and 71. The upper pipe lines 70 need only to be used when the tanks are constructed airtight. The service tank 68, or rather its bottom end is located or disposed in a horizontal plane somewhat below the horizontal plane of each corresponding end of the several supply tanks 69. By this arrangement a gravity fuel feed from the supply tank to the service tank is obtained.

Above the horizontal plane of the power units 57, a gravity feed tank 72 of appropriate streamline form is suspended. The center posts 67 provide a support for this tank, the ends of the tank having connection as indicated at 73 with said posts.

Upon the top of the service tank 68 a fan pump 74 is mounted. The fan of the pump is located without the hull and in the line of air rush, the pump in its entirety being founded upon and removable with the tank. From the tank 68 via the pump 74, and a lead 75 connecting said pump and the gravity tank 72, fuel is conveyed to said gravity tank continuously. From the tank 72 via leads 76 and 77, the fuel is carried by gravity to the respective motors. The overflow of tank 72 is taken care of by a lead 78 interconnecting said tank 72 and the service tank.

As an auxiliary, fuel may be pumped from the service tank 68, by hand, to the gravity tank 72. To this end a hand pump 79 and leads 80 and 81 are provided. Through operation of the hand pump, fuel is drawn from the service tank and conveyed via the leads 80 and 81 to the tank 72. Said lead 81, throughout a portion of its length, underlies a diagonal brace 82 for the engine section. This brace, as illustrated in Fig. 4 comprises substantially alined sections arranged to extend respectively from the rear center wing post 57 in the horizontal plane of the engine beds forwardly to the panel beam 54 equidistant from its ends, and from said panel beam forwardly for anchorage interiorly of the hull above its hydroplaning bottom. The tanks, it will be noted, underlie said brace 82 throughout the major portion of its length, and where the brace extends into the hull, the tanks are disposed about it.

The oil system of the power plant includes in addition to the oil pumps of each motor (not shown) an oil supply tank or reservoir 83, an oil pump 84 and leads 85 and 86 which extend, via the pump, from the reservoir 83 to the respective motors. Said leads 85 and 86 also underlie the diagonal brace 82 throughout a portion of its length.

To provide for a convenient starting of the respective motors, it is proposed to equip each motor with a separate starting device. These devices, constructed in duplicate, are arranged intermediate the panels 44 and 46 of the engine section to permit of operation from a point in convenient proximity to the hull. The starting device illustrated in Figs. 13 and 14 comprises a shaft 87, clutch 88, arm 89, spring 90, supporting bracket 91, operating cord 92, trip or handle 93, sheave 94, return spring 95, clip 96, plate 97 and connecting rope 98, the latter extending from the plate 97 to the return spring 95. The bracket 91 is arranged to interconnect the beams of the engine bed and to support the starting device in its entirety. The sheave 94 is mounted on the rear center wing post 67 of the engine section and the operating cord 92 trained thereover. The free end of the cord is equipped with the grip 93 and its opposite end fastened as indicated at 99 to the crank arm 89 of the starting device. Said arm 89 and the plate 97 are made integral. By exerting a pull on the operating cord 92, the arm 89 and the plate 97 are given a fractional turn and the spring 95 expanded. The plate 97 being mounted on the shaft 87 and the clutch 88 being integrally formed upon one end of the shaft, movement of the arm 89 as indicated will impart to said clutch a turning movement. As the rear end of the motor crank shaft (not shown) is equipped with a clutch face complemental to the clutch 88, the desired initial rotation of the crank shaft is obtained. The spring 90 yieldingly maintains the clutch 88 in engagement with the clutch of the crank shaft. By this arrangement both motors may be started with facility from a point interiorly of the hull without necessitating manual rotation of the propeller which is both inconvenient and dangerous.

Another feature of the invention we have illustrated in Fig. 20 wherein the improved radiator bracket, designated in its entirety by the numeral 100, is shown. This bracket comprises a lightened body portion 101, radiator supporting ledge or flange 102, legs 103 and sockets 104. The sockets 104 are constructed to snugly receive the forward terminals of the engine bed beams 58 and the legs 103 bifurcated as indicated at 105 to straddle the forward V-struts of the respective wing post frames. Said legs and said flange 102 are integrally united. The radiators, forming elements of the respective power units, rest directly upon the brackets 100 and are accordingly dually supported.

Figure 23:
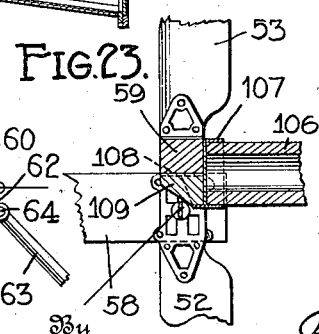
Fig. 23 is a section on the line 23—23 of Fig. 22.
Figure 24:
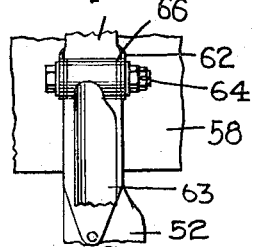
Fig. 24 is an elevation of one of the pivotal connections of an engine bed brace.

Spars or outriggers 106 extend rearwardly in prolongation of the respective engine beds to brace the empennage of the craft. These spars, together with the tail portion of the hull, may be said to constitute a fuselage structure of triangular form in transverse section, the triangle being isoceles and the spars disposed at the base angles of said triangle. The spars 106 at their forward ends abut the cross bars 59 of the engine beds, fittings 107 providing anchorages for the respective spars at said forward end. Each fitting 107 is socketed to receive the spar terminal and laterally flanged as indicated at 108 to underlie the cross bar 109. The fittings, in this position, are bolted in place. If desired, a block 59 of streamline form may be provided at the forward end of each spar to avoid an abrupt forward termination. The fitting construction and block arrangement is illustrated advantageously in Fig. 23.

Said spars 106 at their rearward ends are bifurcated to receive the leading edge of the horizontal stabilizer 110. Fittings 111 of suitable design brace and clamp the spars at their bifurcated terminals and at the same time provide anchorages for diagonal braces 112 which extend forwardly from the spar terminals to the tail of the hull (see Fig. 1). These braces effectually laterally brace the horizontal stabilizer 110.

In addition to the horizontal stabilizer 110, the empennage of the craft comprises a vertical stabilizer 113, a rudder 114, and elevator flaps 115, the latter comprising sections disposed at opposite sides of the rudder. The horizontal stabilizer is constructed of metal tubing 116, fore and aft ribs 117, transverse ribs 118, and a transverse beam 119, the beam connecting the rear terminals of the spars or outriggers 106. By constructing the frame 116 of metal tubing, brazed on rib-clips 120 may be used to secure the ribs 117 in place. Said metal tubing is further advantageous in that greater strength and a better streamline are obtained. Interiorly, the stabilizer is braced by cross arranged wires 121. Notches 122 formed in the ribs 117 permit of the interior disposition of the wires without contact with the ribs.

The vertical stabilizer is somewhat similarly constructed (referring to stabilizer 110) in that it comprises fore and aft ribs 123, transverse ribs 124, and a frame 125. The frame, however, of the vertical stabilizer is constructed of wood, extended as indicated at 127, and equipped with a clip 126. The clip 126 engages with the hull of the boat to provide a fastening means for the stabilizer at its forward end and the extension 127 with the stern post of the hull to serve as a tail post clip. In lieu of wiring the vertical stabilizer is interiorly braced by means of a diagonal stabilizer brace 128 extended at one end into the hull for fitting engagement in a socket (not shown). Said extension 127 is preferably a prolongation of the vertical stabilizer post 127'.

The constructional details of the rudder are also quite similar to the constructional details of the horizontal stabilizer 110. The rudder frame 129 is of metal tubing shaped as desired with its ends securely fastened to the terminals of the rudder post 130. The rudder post is coextensive with the vertical stabilizer post (including its prolongation) and the rudder hinged to said stabilizer post by mortised rudder hinges 131. These hinges (see Fig. 28) each include a hinge plate 132, hinge pin 133, and a retaining plate 134, the latter engaging in a mortise 135 of the stabilizer post where it is fastened by through-bolts 136. Intermediate its ends the rudder post 130 is offset as indicated at 137 to avoid contact with the trailing edge of the horizontal stabilizer 110. Brazed on rib clips 138 provide fastening means for the fore and aft ribs 139 of the rudder. In addition to the fore and aft ribs 139, intersecting ribs 140 and diagonal braces 141 are provided. At its base the rudder is provided with a water-board 142 secured in place by brazed on clips 143.

A detail description of the elevator flaps is thought unnecessary in view of their similarity in construction to the rudder 114. Dual king posts, however, are provided for both the rudder 114 and for the elevator flaps 115, the king posts 144 of the rudder being disposed respectively above and below the plane of the elevator flaps. Rudder leads 145, located without the hull aft of a point 146 provide an appropriate operating means for the rudder. Sheaves 147, disposed adjacent the entering or leading edge of the horizontal stabilizer direct movement of the upper rudder leads 145. The king posts 148 of the elevator flaps are disposed in pairs at opposite sides of the rudder. Elevator leads 149 extended at their forward end into the interior of the hull provide for operation of the elevators. The upper elevator leads, to avoid contact with the horizontal stabilizer 110 penetrate said stabilizer (see Fig. 2), boxed-in openings 150 being formed in said stabilizer for this purpose. The manner in which these openings 150 are formed is illustrated in Fig. 26 wherein it will be noted that the boxed-in sides extend angularly in the general direction of the elevator leads.

Interiorly, the hull 35 is divided transversely by bulkheads 151, 152 and 153, the bulkhead 151 underlying the forward wing beam 54 of the engine section, the bulkhead 152 underlying the rear wing beam 55, and the bulkhead 153 being disposed aft of the bulkhead 152. Three cockpits, designated respectively 154, 155 and 156 are thus provided. Cockpit 154 (forwardly located) is designed to accommodate a portion of the flying crew and one or more of the motive fluid tanks, cockpit 155 (intermediately located) the bulk of variable or exhaustible load, and cockpit 156 (located aft) the pilot. The entire load is thus distributed symmetrically about the center of gravity with the variable load in the immediate vicinity of the vertical plane thereof. Seats 157, arranged side by side, are provided in the cockpit 154, each seat having an individually foldable seat-back 158. These seat backs normally obstruct passageway from the cockpit 154 to the cockpit 155. At times, however, communication between these two cockpits is desirable. For this reason the seat-backs 158 are hingedly connected as at 159 to the sides of the hull for swinging movement in a lateral plane against said sides. By folding both seat-backs against the sides of the hull, an unobstructed passageway between said cockpits 154 and 155 is formed. Normally, the seatbacks are held extended by means of hooks 160 adapted to engage in eyes 161 secured to the respective seat backs (see Figs. 5 and 18).

For protection against the elements the intermediate cockpit 155 is equipped with a covering 162 constructed of intersecting ribs 163 and a substantially rectangular frame 164, the frame, by reason of its construction, engaging respectively the sides of the hull and the beams 54 and 55 which extend therethrough. A hatchway 165, if desired, may be provided at one side of the cover.

As a further protection against the elements, the forward cockpit 154 is equipped with a removable covering or hood 166. Said hood is preferably constructed of water-proof fabric and forwardly provided with transparencies 167. A cam lock 168, detailed in Fig. 17 and a specially constructed hinge 169, detailed in Fig. 16, characterize the hood. When not in use, the hood may be either folded or removed.

In Fig. 12, we have illustrated a float-actuated gage 170 for the service tank 68, the gage extending at one end without the hull of the craft for observation from the aft cockpit 156. This or any other suitable type of gage, however, may be provided. Ailerons 171, aileron leads 172, tractor propellers 173, and a tail skeg 174 additionally characterize the craft.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. In an aircraft, superposed supporting surfaces including wing beams, engine beds supported at opposite sides of the longitudinal axis of the craft between the supporting surfaces, a body, and braces extending diagonally inwardly and downwardly from the respective beds for connection with said body.

2. In an air craft, a body, engine beds supported at opposite sides of and above the body, and downwardly and inwardly extending terminally pivoted braces connecting the engine beds with said body.

3. In an aircraft, a body, engine beds disposed symmetrically above and at opposite sides of the body, and pairs of vertically V-arranged engine bed braces having their apices founded upon said body.

4. In a flying boat, the combination of a hull, a motor, a plurality of fuel tanks inclosed within the hull, the relative arrangement of the tanks being such that space for occupancy by at least one of the flying crew is provided within the hull immediately adjacent the several tanks whereby access may be gained to the tanks by the occupant of such space, a connection between one of the tanks and the motor, and a connection between the remaining number of tanks and the tank connected with the motor, all of the tanks, as well as the space above referred to, being situated in the vicinity of and substantially symmetrically above a line passing vertically through the center of gravity of the machine.

5. In an air craft, the combination, of supporting surfaces, a motor intermediately located between the supporting surfaces, an engine bed comprising lateral engine bed beams, a radiator mounted directly in front of the motor, a radiator bracket, and sockets formed on the radiator bracket to receive the engine bed beam.

6. In an aircraft, a body, a motor unit, terminally pivoted braces for said motor unit, and a motor vibration absorbing means disposed at the respective terminal pivots.

7. In an aircraft, an engine bed, supports for the engine bed, and a radiator bracket suspended from the engine bed and braced to the engine bed supports.

8. In an aircraft, an engine bed, a radiator, a radiator bracket carried by the engine bed, a support for the engine bed, and a brace connection between the engine bed support and the radiator bracket.

9. In an aircraft, the combination with an engine bed, of a radiator, and a radiator bracket comprising legs dependent from the engine bed, and a supporting ledge carried by the dependent legs and extended beneath the radiator.

10. In an aircraft, engine bed beams, a radiator supporting ledge, legs embracing and dependent from the beams to support the ledge, and means cross bracing the legs.

11. In an aircraft, an engine bed comprising beams, struts supporting said beams, a radiator bracket, sockets formed upon said bracket to engage the corresponding terminals of said beams, and legs formed on said bracket to engage said struts.

12. In an aircraft, supporting surfaces, a motor, an engine bed, a support for the engine bed, and a strut founded on said motor to constitute with the support and the motor a wing post frame.

13. In an aircraft, supporting surfaces, a motor, and a wing post frame constructed to include said motor as an element thereof.

14. In an aircraft, supporting surfaces including an engine section, an engine bed, V-arranged struts erected on the lower panel of the engine section to support said engine bed, a motor, and a strut erected upon said motor to form with said V-arranged struts and said motor a wing post frame.

In testimony whereof we affix our signatures.

GLENN H. CURTISS.
HENRY KLECKLER.